United States Patent
Erlach

[11] Patent Number: 5,322,412
[45] Date of Patent: Jun. 21, 1994

[54] METHOD AND APPARATUS FOR OPTIMIZING THE OPERATING PARAMETERS OF A DOUBLE-REGULATED WATER TURBINE

[75] Inventor: Josef Erlach, Ravensburg, Fed. Rep. of Germany

[73] Assignee: Sulzer Escher Wyss AG,, Zurich, Switzerland

[21] Appl. No.: 886,108

[22] Filed: May 21, 1992

[30] Foreign Application Priority Data

May 22, 1991 [CH] Switzerland .......... 01516/91

[51] Int. Cl.⁵ ............................ F01D 17/00
[52] U.S. Cl. ...................... 415/1; 415/118; 364/494
[58] Field of Search ............. 415/1, 13, 14, 30, 32, 415/33, 47, 48, 49, 50, 118; 364/494, 550, 551.01

[56] References Cited

U.S. PATENT DOCUMENTS

| | | | |
|---|---|---|---|
| 4,073,594 | 2/1978 | Takagi et al. | 415/1 |
| 4,184,337 | 1/1980 | Bloch | 415/17 |
| 4,273,508 | 6/1981 | Fomichev et al. | 415/17 |
| 4,382,745 | 5/1983 | Kuwabara et al. | 415/1 |
| 4,435,770 | 3/1984 | Shiohata et al. | 364/494 |
| 4,568,240 | 2/1986 | Ichikawa | 415/14 |
| 4,794,544 | 12/1988 | Albright et al. | 364/494 |
| 4,796,213 | 1/1989 | Blotenberg | 415/1 |
| 5,060,176 | 10/1991 | Nawa et al. | 364/550 |
| 5,076,755 | 12/1991 | Okada | 415/17 |
| 5,187,434 | 2/1993 | Ando | 364/508 |

FOREIGN PATENT DOCUMENTS 935540 11/1955 Fed. Rep. of Germany .
1099349 9/1955 France .

OTHER PUBLICATIONS

"Optimizing Turbine Efficiency Using Index Testing", Steendahl, J. D., *Mechanical Engineering*, Band 110, No. 10, New York, NY, Oct. 1988, pp. 74–77.

Primary Examiner—John T. Kwon
Attorney, Agent, or Firm—Sandler, Greenblum & Bernstein

[57] ABSTRACT

In a water turbine having a distributor with adjustable guide vanes and a runner having adjustable runner blades, optimization of the operating parameters is performed indirectly in that fluctuations in intensity of the generator output or the bearing oscillations of the water turbine are determined without taking account of the absolute values and are set or adjusted to a minimum.

18 Claims, 2 Drawing Sheets

METHOD AND APPARATUS FOR OPTIMIZING THE OPERATING PARAMETERS OF A DOUBLE-REGULATED WATER TURBINE

BACKGROUND OF THE INVENTION

1. Field of the Invention

The invention relates to a new and improved apparatus and method for optimizing the operating parameters of a water turbine coupled to an electrical generator. Generally speaking, the water turbine is of the type comprising a distributor having adjustable guide vanes and a runner having adjustable runner blades. The positioning of the guide vanes of the distributor is varied in accordance with the positioning of the runner blades of the runner.

2. Discussion of Background and Material Information

Water turbines are typically utilized with a generator to obtain electric power with optimum efficiency from a moving stream of water, which may have either a given or variable flow rate and velocity, and a differing height of fall. In order to attain the maximum possible efficiency in energy conversion, it is necessary to appropriately optimize the operating parameters of the water turbine (which include, among other things, the respective positionings of the guide vanes and runner blades). In particular, the positioning of the guide vanes of the distributor must be accurately adjusted for each given position of the runner blades of the runner, while taking into account other operating conditions of the turbine.

In double-regulated water turbines, such as Kaplan or tubular type water turbines, however, optimization of the operating parameters presents several difficulties in practice, and generally results in considerable expense.

A known method of determining the optimum operating parameters of a water turbine is described, for instance, in DE 935 540. The positioning of the guide vanes is set as a function of the generator output. However, with this known method, the determination of the optimum association of the distributor with a given runner position involves considerable effort and expense. To this end, field tests are performed in which different guide vane positions are operated with step-wise adjustment for a given runner blade position. This yields a so-called propeller curve. A plurality of successive propeller curves are attained across the entire power range. An enveloping curve is then placed over the propeller curves to determine, by use of the tangent points which contact the propeller curves, the optimum association between the guide vane and runner blade positions.

The following parameters are necessary to determine these propeller curves:

1. The turbine output, determined from the generator output;
2. the difference in height (i.e., the height of fall) between the upper and lower water levels; and
3. the flow (stream) of water.

The generator output and height of fall can be determined with little difficulty and with sufficient accuracy and consistency. In addition, these parameters are usually already available in the form of a permanent signal. However, accurate recording of the water flow is known to be quite difficult and thus considerably expensive. The water flow can be recorded in various ways, such as with current-meter measurements, ultrasound, flow probes, etc.

The Winther-Kennedy differential pressure method of measurement is a conventional technique for measuring the water flow and is usually used. In so doing, the differing velocity in the spiral is used according to the law of angular momentum. The measurement, made at two sampling bores in the spiral, at different radial distances from the turbine axis, yields a differential pressure which depends upon the flow (stream) of water.

There are a number of disadvantages associated with the differential pressure method of measurement. For example, great care must be taken to obtain reliable measured values. Care must be taken to provide good aeration, and silting-up of the measuring bores, etc. must be avoided. A reliable, well-functioning measurement of differential pressure is also difficult to obtain for an operational long-term measuring apparatus. Moreover, in many installations, in particular those of older construction, no differential pressure measurement connections are provided in the spiral.

If additional turbines are connected or disconnected as a result of a change in the rate of water or due to increased or reduced demand for electricity, the optimum operating parameters will change, and a new series of measurements must be performed to determine the altered optimum operating parameters.

Attempts have been made, without much success, to automate setting of the optimum operating parameters described above and thus to shorten the measuring times. Furthermore, attempts have been made to perform model experiments instead of the large-scale production trial. However, these attempts have not always resulted in optimum operating parameters which sufficiently correlate with actual practice.

SUMMARY OF THE INVENTION

Therefore, with the foregoing in mind, it is a primary object of the present invention to provide an improved method and apparatus for determining the optimum operating parameters of a double-regulated water turbine, in a manner not afflicted with the aforementioned limitations and drawbacks of the prior art.

Another and more specific object of the present invention is aimed at providing at an improved apparatus and method for providing the optimum operating parameters of a double-regulated water turbine, while eliminating the aforementioned drawbacks of the prior art and, in particular, such apparatus and method which will use parameters that can be recorded readily and accurately. It is a further object to provide such apparatus and method, which are automatic, more rapid, responding quickly to changes in operating conditions, and which are less costly.

Now, in order to implement these and still further objects of the present invention, which will become more readily apparent as the description proceeds, the method of the present invention for determining the optimum operating parameters of a double-regulated water turbine is manifested by, among other things, determining the intensity of fluctuations over time of a measured value determined during operation of a water turbine. The measured value is dependent, at least in part, upon the positioning of guide vanes of the water turbine, and setting the guide vanes to a position in which the fluctuations in intensity of the measured value are at a minimum. Further, according to the present invention, the water turbine is coupled to an electrical generator, and comprises a distributor having adjustable guide vanes and a runner having adjustable runner blades. The positioning of the guide vanes of the distributor vary in accordance with each given position of the runner blades of the runner.

As to a further aspect of the present invention, the measured value comprises a parameter obtained from the output of the electrical generator.

It is further contemplated that the water turbine includes bearings, and the measured value comprises a parameter representative of oscillations of the bearings.

Furthermore, the intensity of the fluctuations of the measured value may be determined as a function of fluctuations of the measured value which occur within a given frequency range. The frequency range may be set by a high-pass filter.

According to a further feature, the intensity of fluctuations of the measured value is determined by formation of an effective value (i.e., a root-mean-square value) of an AC power value formed at an output of the electrical generator.

Still further, it is contemplated to repeat the steps of determining and setting. For example, the steps of determining and setting may be repeated upon occurrence of a predefined change in the measured value. In addition, or in the alternative, the steps of determining and setting may be repeated upon occurrence of a predefined change in one or more operating conditions of the water turbine. Still further, the steps of determining and setting may be repeated as soon as the intensity of fluctuations of the measured value exceeds a given threshold value.

The present invention further relates to an apparatus for optimizing the operating parameters of a water turbine coupled to an electrical generator. The water turbine includes a distributor having adjustable guide vanes and a runner having adjustable runner blades; the position of the guide vanes of the distributor vary in accordance with each given position of the runner blades of the runner. A device is provided for determining the intensity of fluctuations over time of a measured value determined during operation of the water turbine, the measured value being dependent upon the position of the guide vanes. In addition, a device is provided for setting guide vanes to a position in which the fluctuations in intensity of the measured value are at a minimum.

It is further contemplated that the determining device includes a device for measuring the intensity of fluctuations of the measured value based on fluctuations occurring within a given frequency range.

The measured value may include a parameter obtained from an output of the electrical generator. In addition, or in the alternative, the measured value may comprise a parameter representative of bearing oscillations of the turbine.

As to a further aspect of the present invention, a high-pass filter is provided, wherein the frequency range is set by the high-pass filter.

Still further, according to the present invention, the apparatus may include a device for repeatedly activating the determining device and the setting device. Such a device may be provided for repeatedly activating the determining and setting devices at given intervals of time, upon occurrence of a predefined change in the measured value, or upon occurrence of a change in one or more operating conditions of the water turbine. In addition, such a device may be provided to repeatedly activate the determining and setting devices as soon as the intensity of fluctuations of the measured value exceeds a given threshold value.

BRIEF DESCRIPTION OF THE DRAWING

The invention will be better understood, and objects other than those set forth above will become apparent when consideration is given to the following detailed description thereof. Such description, at least in part, makes reference to the annexed drawings which depict a schematic diagram of a Kaplan turbine and an optimizing apparatus and method according to the present invention, with like parts being identified with the same reference numbers, wherein.

DETAILED DESCRIPTION OF THE PREFERRED EMBODIMENTS

Describing now the drawings, it is to be understood that only enough of those steps of the method and pertinent elements of apparatus of the present invention have been depicted therein, in order to simplify the illustrations, as needed for those skilled in the art to readily understand the underlying principles and concepts of the present invention.

Figure 1:
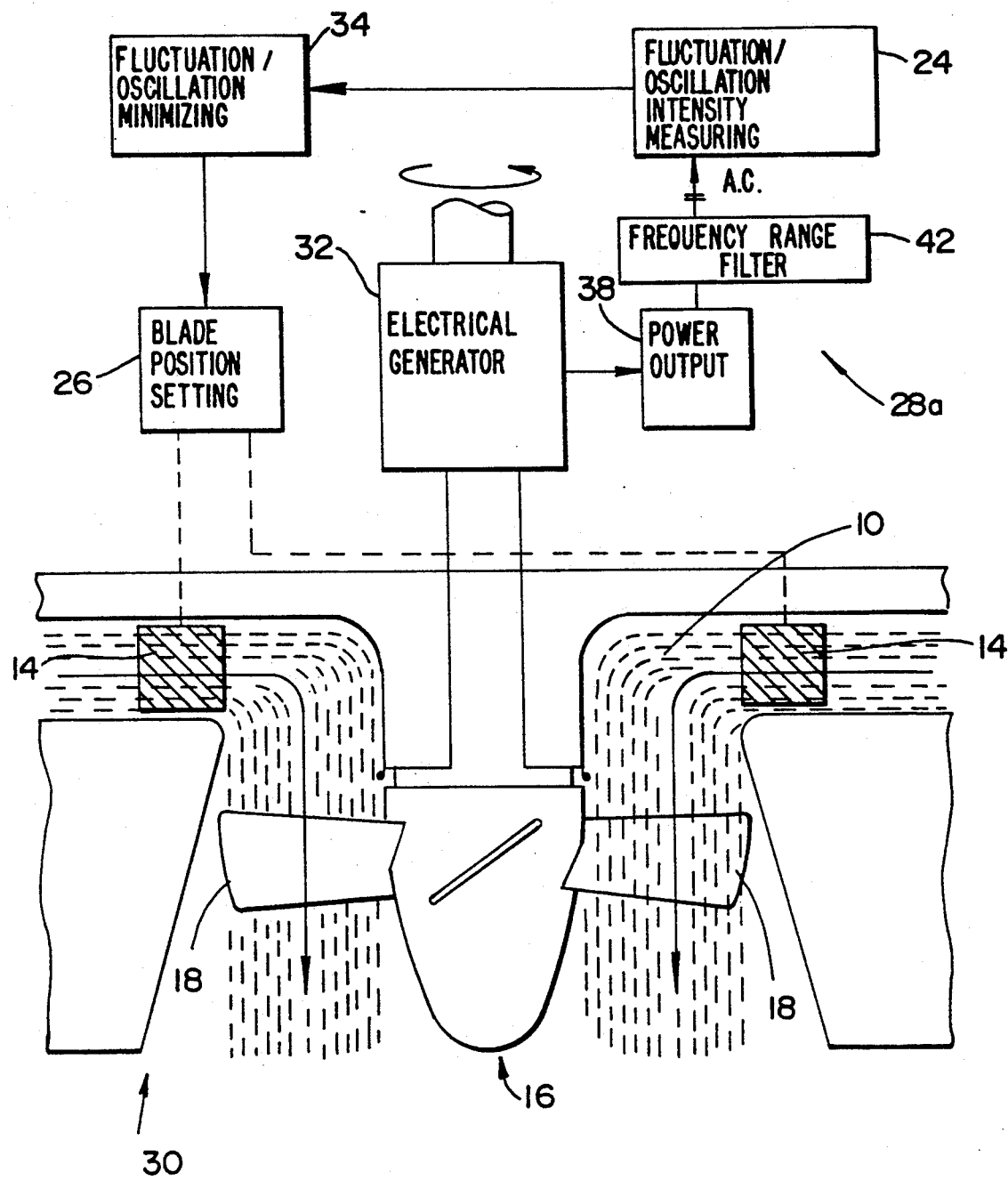
FIG. 1 is a schematic view of one embodiment of the present invention.

Turning attention now to FIG. 1, a Kaplan or propeller turbine 30 and optimizing system 28a are depicted. Water 10 enters turbine 30 laterally, is deflected by guide vanes 14, and flows axially through a propeller 16, thus setting propeller 16 in rotation. The flow rate of water 10 through turbine 30 can be controlled by varying the position of guide vanes 14. More specifically, the position of guide vanes 14 is set as a function of the setting of runner blades 18 in order to obtain maximum efficiency. The rotational movement of propeller 16 in turn drives shaft 20 which is coupled, directly or through a gearing mechanism, to an electrical generator 32.

Further, referring to FIG. 1, in the depicted embodiment, the measured value is input to intensity measuring device 24, and is produced by the AC power measuring device 38 which is coupled to an output of electrical generator 32.

Figure 2:
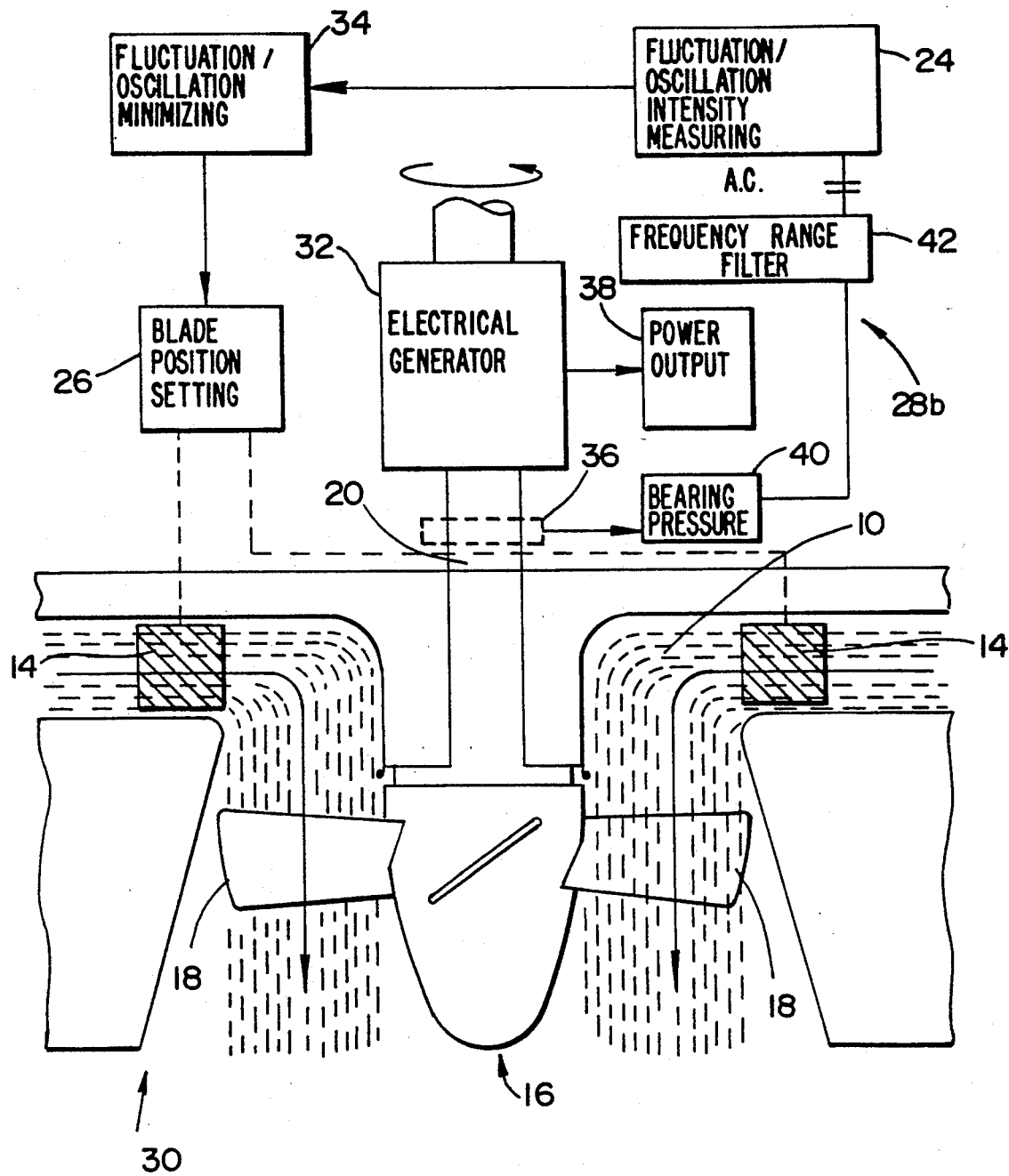
FIG. 2 is a schematic view of another embodiment of the present invention.

In the alternative, as indicted in FIG. 2, in optimizing system 28b, the measured value may be produced by a bearing pressure measuring device 40, which is appropriately coupled to a bearing 36 of shaft 20. In both the FIG. 1 and 2 embodiments, an output of intensity measuring device 24 is connected to a control device 34, the output of which is connected to a position setting mechanism 26. Outputs of position setting mechanism 26 are appropriately coupled to guide vanes 14, to control movement thereof.

Now, describing the operation of optimizing systems 28a and 28b the intensity measuring device 24 determines the intensity of fluctuations over time of a measured value determined during operation of water turbine 30. The measured value is dependent upon the position of guide vanes 14, and indirectly represents the efficiency with which the water converts energy into a rotational movement of shaft 20. Control device 34 drives position setting mechanism 26 to set the guide vanes to a position in which the fluctuations in intensity of the selected operating parameter are at a minimum.

It is noted that an incorrect adjustment or association between the positions of the runner blades 18 and the guide vanes 14 of the distributor will cause separations of flow, which will result in random pressure fluctuations in the draft tube. The measured value indirectly indicates or represents such random pressure fluctuations. In this regard, the measured value may be determined in FIG. 2, based upon bearing and torsional oscillations, by measuring the instantaneous pressure exerted on bearing 36, which may be determined by the use of an appropriate sensor.

The above-noted draft tube pressure fluctuations and subsequent oscillation behavior of the turbine will also be reflected in terms of a fluctuation in AC or instantaneous power at an output of the generator 32. Therefore, advantageously, the fluctuations in intensity of the power output from the generator can be utilized as the measured value.

A suitable mechanism may be provided for continually detecting either of the instantaneous bearing pressure of the turbine or the AC power fluctuations at the generator output, so as to continually detect these values and thus facilitate a suitable "on line" evaluation by intensity measuring device 24. This continual detection will in turn facilitate a well-set correlation between the respective positions of guide vanes 14 and runner blades 18, by use of position setting mechanism 26 as driven by control device 34.

The intensity measuring device 24 does not directly determine the measured value by, for example, merely detecting the amplitude of the measured value, or the static portion or the maximum of the measured value. Rather, in a deliberate departure from the direct path for optimization, the extent to which the measured value alternates, i.e., fluctuates, within a certain frequency range, is determined by intensity measuring device 24. For example, in the case of determining the intensity of fluctuations in time of the AC generator output power, the intensity of the fluctuation in such power is determined.

In this case, when determining the intensity of the fluctuations of the output generator power, this value generally corresponds to (and is somewhat dependent upon) the ideal flow against the runner blades 18, or the initial whirl or after-whirl produced during flow-out. In this case, oscillation of the generator power output is produced by periodic and random pressure fluctuations in the output water which exits turbine 30. On the other hand, when the water which is entering the portion of turbine 30 in which runner blades 18 are situated, is in an ideal, efficient state, the absolute value of the generator output power will be at a maximum, and in addition, the fluctuations or oscillation of the generator output power will be at a minimum.

The determination of the magnitude or absolute value of the generator output power involves a somewhat complex task, as compared to the determination of the AC fluctuations of the generator output power. Measurement of the pressure difference of the water flow, or the water through flow, is even more difficult to accurately measure.

As noted above, the measured value is determined which may, e.g., comprise the AC power output (or a value indicative thereof) of electrical generator 32 as depicted in FIG. 1 or the pressure exerted on bearing 36, as depicted in FIG. 2. Advantageously, the effective value, i.e., the root-mean-square of the measured value is determined, which is indicative of the proper adjustment of the guide vanes. The distributor position is adjusted accordingly, in order to minimize the effective value, by means of a closed loop control device 34 and a suitable vane position setting mechanism 26. The intensity of the fluctuations of the measured value may be determined by ascertaining the peak-to-peak amplitude of the measured value.

Preferably, the generator output power signal is sent through a high-pass filter 42 before being input into intensity measuring device 24, in order to eliminate the DC component of the power and low-frequency power oscillations, caused by, e.g., fluctuations in the height of fall of the water which enters turbine 30.

Instead of the power signal, in the FIG. 1 embodiment, reference oscillations on the turbine, such as bearing oscillation, in the FIG. 2 embodiment, may be used as an evaluation signal with the same effect. That is, similar filtering can be provided in the monitoring of bearing pressure oscillations before inputting the measured value to the intensity measuring device.

The operating parameters of water turbine 30 are set in accordance with the above-described method and apparatus until a new optimization of operation (i.e., a resetting of the position of guide blades 14) is required. Such re-optimization, which, as a rule, will take less than an hour, may, for instance, be performed automatically at regular timed intervals. In the alternative, such a repeat of the re-optimization procedure may be performed automatically as a result of a predetermined change in the output power of the generator 32. Likewise, it is advantageous to provide such re-optimization upon each change in the operating conditions of turbine 30, and, in particular, also when connecting or disconnecting neighboring turbines of an overall power station.

It is particularly advantageous, e.g., to trigger re-optimization of the operating parameters of turbine 30 as soon as the intensity of the fluctuation (as determined by intensity measuring device 24) of the AC generator output power exceeds a given threshold value. As a rule, such a detection of the intensity of the fluctuation exceeding a given threshold indicates a change in the operating conditions, in such form as a drift of the operating parameters away from an optimum range. In addition, such a threshold value trigger may be provided to accommodate changes in the operating parameters of the installation, for instance, for obstruction and silting-up, which render purging of the machine necessary.

It is noted that a minimum frequency of the above-noted evaluated fluctuations (which can be, for example, set by the above-described high-pass filter) should be higher than the AC output frequency of the generator at normal rotational speed (if an AC current is produced). The normal AC current of the generator is not evaluated, but the stochastic fluctuations or noise, having a much higher frequency spectrum (typically in the range of kilocycles, or at least higher than 100 c.p.s.), are evaluated.

While there are shown and described present preferred embodiments of the present invention, it is distinctly to be understood that the invention is not limited thereto, but may be otherwise variously embodied and practiced within the scope of the following claims.

I claim:

1. A method for optimizing the operating parameters of a water turbine coupled to an electrical generator, said water turbine comprising a distributor having adjustable guide vanes and a runner having adjustable runner blades, the position of the guide vanes of the distributor varying in accordance with each given position of the runner blades of the runner, said method comprising:

determining the intensity of fluctuations over time of a measured value determined during operation of the water turbine, within a given frequency range, said measured value being a function of the position of the guide vanes; and setting the guide vanes to a position in which the fluctuations in intensity of said measured value, within said given frequency range, are at a minimum.

2. The method according to claim 1, wherein:
said measured value comprises a parameter obtained from an output of the electrical generator.

3. The method according to claim 1, wherein:
said water turbine includes bearings, and said measured value comprises a parameter representative of bearing oscillations of the turbine, obtained by measuring the fluctuations of the instantaneous pressure exerted on said bearings.

4. The method according to claim 1, wherein:
the given frequency range is set by a high-pass filter.

5. The method according to claim 1, wherein:
said intensity of fluctuations of said measured value is determined by formation of the root-mean-square of an AC power value formed at an output of the electrical generator.

6. The method according to claim 1, wherein:
said steps of determining and setting are repeated at given intervals in time.

7. The method according to claim 1, wherein:
said steps of determining and setting are repeated upon occurrence of a predefined change in said measured value.

8. The method according to claim 1, wherein:
said steps of determining and setting are repeated upon occurrence of a change in one or more operating conditions of the water turbine.

9. The method according to claim 1, wherein:
said steps of determining and setting are repeated as soon as the intensity of fluctuations of said measured value exceeds a given threshold value.

10. An apparatus for optimizing the operating parameters of a water turbine coupled to an electrical generator, said water turbine comprising a distributor having adjustable guide vanes and a runner having adjustable runner blades, the position of the guide vanes of the distributor varying in accordance with each given position of the runner blades of the runner, said apparatus comprising:

means for determining the intensity of fluctuations over time of a measured value determined during operation of the water turbine, within a given frequency range, said measured value being dependent upon the position of the guide vanes; and means for setting the guide vanes to a position in which the fluctuations in intensity of said measured value, within said given frequency range, are at a minimum.

11. The apparatus according to claim 10, wherein:
said measured value comprises a parameter obtained from an output of the electrical generator.

12. The apparatus according to claim 10, wherein:
said water turbine includes bearings, means for obtaining bearing oscillations of the turbine by measuring the fluctuations of the instantaneous pressure exerted on said bearings, and said measured value comprises a parameter representative of bearing oscillations of the turbine.

13. The apparatus according to claim 10, further comprising:
a high-pass filter, said frequency range being set by said high-pass filter.

14. The apparatus according to claim 10, wherein:
said intensity of fluctuations is determined by formation of the root-mean-square of an AC power value formed at an output of the electrical generator.

15. The apparatus according to claim 10, further comprising:
means for repeatedly activating said means for determining and said means for setting at given intervals in time.

16. The apparatus according to claim 10, further comprising:
means for repeatedly activating said means for determining and said means for setting upon occurrence of a predefined change in said measured value.

17. The apparatus according to claim 10, further comprising:
means for repeatedly activating said means for determining and said means for setting upon occurrence of a change in one or more operating conditions of the water turbine.

18. The apparatus according to claim 10, further comprising:
means for repeatedly activating said means for determining and said means for setting as soon as the intensity of fluctuations of said measured value exceeds a given threshold value.

* * * * *